A. B. CADMAN.
TRAILER TRUCK.
APPLICATION FILED AUG. 12, 1918.
1,421,402.
Patented July 4, 1922.
2 SHEETS—SHEET 2.
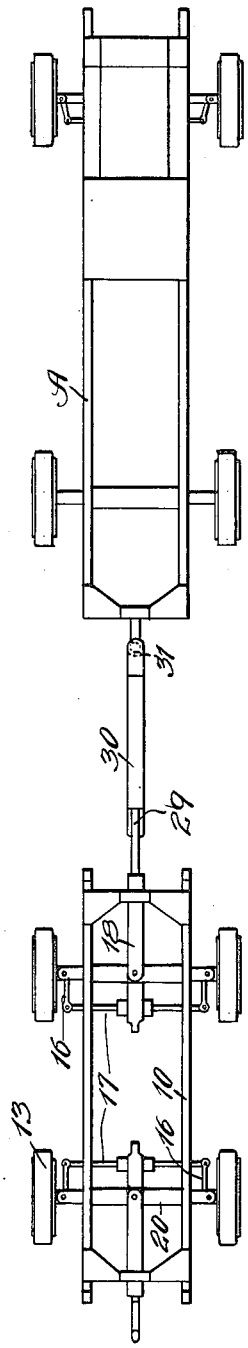
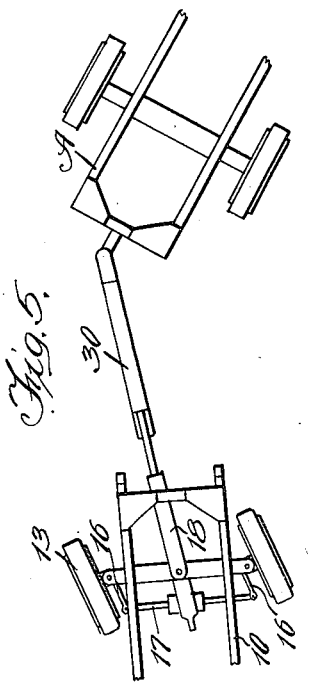
Witnesses:
W. F. Kilroy
Harry R. L. White
Inventor:
Addi Benjamin Cadman,
By Miller, Chindahl & Parker
Attys.

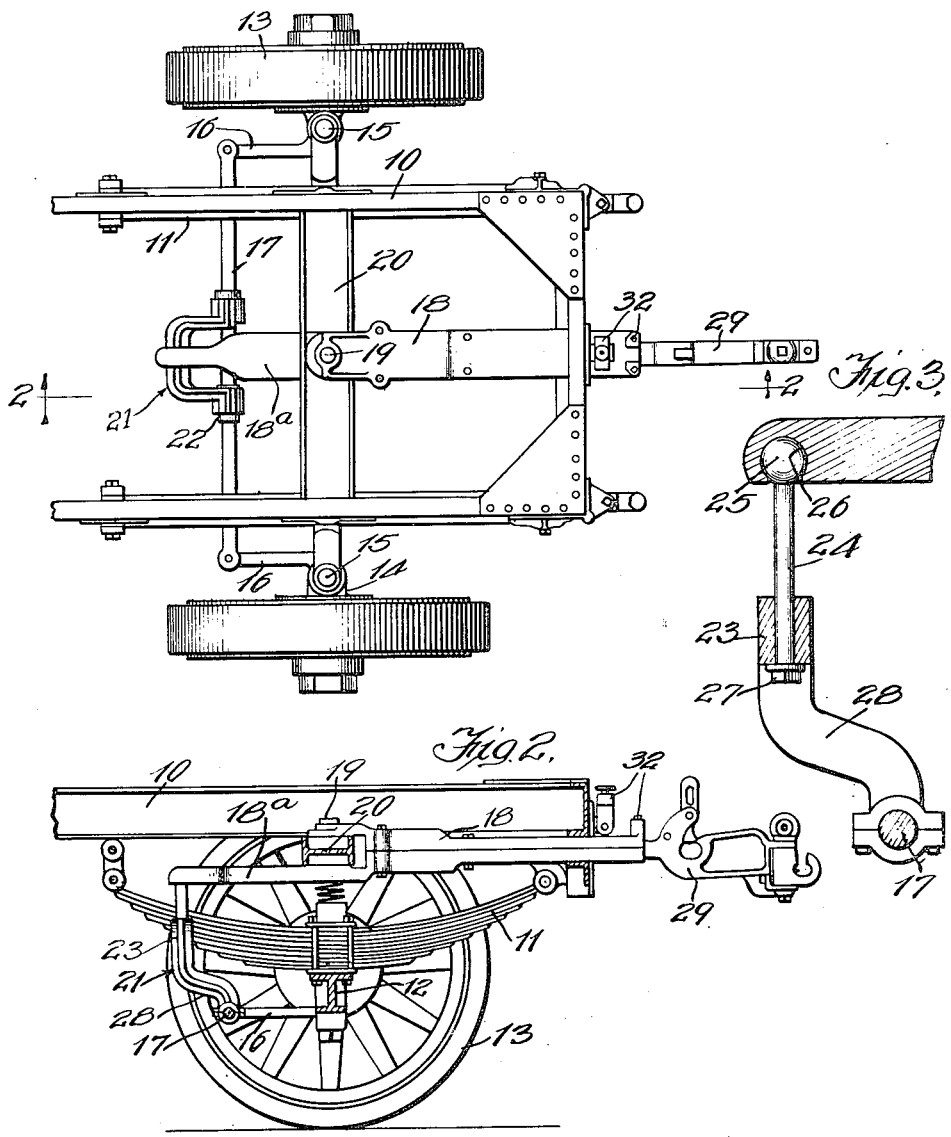

UNITED STATES PATENT OFFICE.

ADDI BENJAMIN CADMAN, OF BELOIT, WISCONSIN, ASSIGNOR TO WARNER MANUFACTURING COMPANY, OF SOUTH BELOIT, WISCONSIN, A CORPORATION OF WISCONSIN.

TRAILER TRUCK.

1,421,402.   Specification of Letters Patent.   Patented July 4, 1922.

Application filed August 12, 1918. Serial No. 249,388.

*To all whom it may concern:*

Be it known that I, ADDI BENJAMIN CADMAN, a citizen of the United States, residing at Beloit, in the county of Rock and State of Wisconsin, have invented certain new and useful Improvements in Trailer Trucks, of which the following is a specification.

This invention relates to a four-wheeled trailer truck which is adapted to be hitched onto a motor vehicle or other drawing unit by means of a draw-bar pivoted on the truck.

Such trailer trucks may be coupled together in any desired number to form a train and preferably each truck is of duplicate construction at opposite ends so that the truck may be drawn and steered from either end.

In trucks of this character, the steering wheels are usually carried by knuckles pivoted at the opposite ends of an axle of the truck, and the draw-bar of the truck is pivoted to the frame and connected with said steering knuckles so that a swinging movement of the draw-bar causes the steering wheels to turn to the same extent. It has been found in practice that when a sharp turn is made by the drawing unit, the movement imparted to the steering wheels of the trailer is such that the trailer "cuts the corner" or makes a turn which is substantially shorter than that of the motor truck or other preceding unit, and hence is liable to encounter obstructions cleared by such unit. It is one object of the present invention to obviate this difficulty by providing a connection between the draw-bar and the steering knuckles which will, when the draw-bar is swung outward by the unit to which it is connected, augment the initial swinging movement of the steering wheels in the same direction and thus retard the turning movement of the trailer frame until it has progressed sufficiently to cause it, when it does turn, to travel substantially in the track of the preceding unit.

When the draw-bar is pivoted on the frame or body of the truck and such frame is supported from the axle by means of springs, there is necessarily relative movement up and down between the frame and the axle. It is a further object of my invention to provide an improved connection between the draw-bar and the steering knuckles of the wheels which is constructed to allow the relative movement above alluded to without affecting the position of the wheels, and which at the same time is rigid or inflexible in effect in its transmission of steering movement from the draw-bar to the steering knuckles.

In the accompanying drawings, Figure 1 is a plan view of one end of a trailer truck embodying the features of my invention. Fig. 2 is a vertical sectional view taken in the plane of line 2—2 of Fig. 1. Fig. 3 is a vertical sectional view through parts of the steering connections. Fig. 4 is a plan view showing the trailer truck connected to a motor truck. Fig. 5 is a fragmentary plan view illustrating the position of the steering wheels of the trailer relative to the draw-bar, when the latter has been swung by its connection with the rear end of a drawing unit.

In the exemplary embodiment of the invention which is illustrated in the drawings, the truck comprises a rectangular body frame 10 of any common or preferred construction which is supported at each end through the medium of two springs 11 from an axle 12. The wheels 13 are mounted on journals carried by steering knuckles 14 which are pivoted to opposite ends of the axle to swing on vertical axes 15. Each steering knuckle has an arm 16 which in the present instance extends toward the middle of the body frame, and the two arms are directly connected by a rigid tie member or rod 17, the ends of which are pivoted to the ends of the arms.

The draw-bar 18 is pivotally connected near its inner end by a vertical king pin 19 with a cross-piece 20 forming a rigid part of the frame 10. A portion of the draw-bar is extended beyond the cross-piece 20 to provide a rigid arm 18ª which is adapted to be connected to the mid-portion of the tie-rod 17. The means forming this connection comprises an upright yoke 21 having bearings at the er ds of its arms to embrace the rod 17 and rotate thereon. The yoke is held against endwise movement along the rod by suitable means such as collars 22 fixed to the rod at opposite ends of the yoke. At the top of the yoke is a bearing 23 through which a pin 24 passes with a sliding fit. Said pin carries at its upper end a ball 25, and on the rear end of the arm 18ª of the draw-bar is a ball-retaining socket 26 within which said ball is entered. Upward sliding movement of the pin is limited by a nut 27 on its lower end.

Either draw-bar may be locked in central position by suitable locking means indicated at 32.

In order to increase the extent of outward swinging movement of the steering wheels beyond that imparted to the draw-bar by the preceding unit to which it is connected, the arm 18ª of the draw-bar is made of a length substantially greater than the arms 16 of the steering knuckles. To accommodate such rearward extension of the draw-bar beyond the vertical plane of the tie-rod 17, the upright yoke 21 is offset rearwardly as at 28 slightly above its connection with the tie-rod.

In practice, the forward end of the draw-bar is connected to the rear end of the drawing unit A. (Figs. 4 and 5) by means of a coupling head 29 on the draw-bar, a separate link 30, and a ball 31, the latter being suitably mounted on the rear end of the drawing unit and engaging in a socket on the link 30. Said head 29 and link 30 are arranged to form a joint which permits relative up-and-down movement between these parts but prevents relative lateral movement, and the forward end of the link has a universal connection with the body frame of the drawing unit. The rear wheels of the drawing unit are fixed against swinging movement, and usually are located a substantial distance from the rear end of the body-frame of the truck.

By the construction thus set forth, it will be apparent that when the drawing unit is swung to execute a sharp turn in either direction, the rear end thereof immediately swings outwardly in the opposite direction and imparts an outward swinging movement to the draw-bar. This movement of the draw-bar is transmitted to the steering knuckles by the arm 18ª, yoke 21 and tie-rod 17, and it will be seen by reason of the greater length of the arm 18ª than that of the arms 16 of the steering knuckles, that the latter will swing through a greater arc, as shown in Fig. 5, transmitting their movement to the steering wheels. Thus, as the trailer is drawn forwardly, its forward end is first caused to travel outwardly beyond the arc of travel of the rear end of the drawing unit. This outward movement of the forward end of the frame serves to retard the turning of the trailer until it has progressed to such an extent that the position of the steering wheels is reversed. Thereupon the forward end of the trailer makes a sharp turn, to follow the drawing unit, and the rear wheels thereof travel substantially in the path taken by the rear wheels of the drawing unit.

Any relative movement between the frame 10 and the axle 12, which may be caused by placing a load on the truck or by one or both of the wheels passing over any unevenness in the road in travel, is taken care of by the yoke 21, pin 24, and ball and socket joint 25—26. The offset formation of the yoke 21 lends itself readily to the sliding connection with the pin 24, in that it carries the pin rearwardly out of the vertical plane of the tie rod, so that the tie rod will not limit the downward movement of the pin.

While the connection between the draw-bar and the wheels accommodates this relative up-and-down motion, said connection is inflexible in its function of transmitting swinging motion from the draw-bar to the wheels so that even slight movement of the draw-bar finds immediate response in the wheels for steering purposes. At the same time the moving parts are all firmly bound together so that there is no looseness or lost motion between any two parts, and therefore any pounding or shock to the parts is eliminated and a noiseless, durable construction is provided.

In some of the trucks of this character heretofore produced, the relative position or distance apart of the frame and the axle had an effect upon the position of the wheels due to the manner of connecting the draw-bar and the wheels, with the result that in passing over a rough road the necessary vibration or relative motion between the frame and the axle caused the constant oscillation of the steering knuckles and produced a "whipping" action or ziz-zag motion of the wheels in their travel along the road. By my improved steering gear, no such effect is possible. The relative motion mentioned is provided for, but by reason of the peculiar relation of the parts such movement has no effect upon the steering gear.

While I have herein shown and described in considerable detail the preferred embodiment of my invention, I recognize that many modifications will occur to those skilled in the art and do not limit myself to the precise structure disclosed. The scope of the invention is pointed out in the appended claims.

I claim as my invention:

1. In a vehicle of the character described, a main frame, an axle having steering knuckles pivoted at its opposite ends, carrying wheels mounted on said steering knuckles, springs for supporting said frame on said axle, a draw-bar pivotally connected to said frame, a transversely extending steering rod pivotally connected with said steering knuckles, a yoke pivotally mounted on said steering rod and having a bearing on its upper end, and a pin having a ball and socket connection with the rear end of said draw bar and arranged to slide in said yoke bearing, said yoke being offset to carry its bearing rearwardly of the steering rod and the rear end of the draw-bar being correspondingly extended.

2. In a vehicle of the character described, a main frame, an axle having steering knuckles pivoted at its opposite ends, carrying wheels mounted on said steering knuckles, springs for supporting said frame upon said axle, a draw-bar pivotally connected to said frame, a transversely extending steering rod pivotally connected to said knuckles, a tubular member mounted on said steering rod to swing forward and back, and a pin having a universal connection with the rear end of said draw-bar and arranged to slide in said tubular member.

3. In a vehicle of the character described, a main frame, an axle having steering knuckles pivoted at its opposite ends, carrying wheels mounted on said knuckles, a transverse member connecting said steering knuckles together, springs for supporting said frame upon said axle, a draw-bar pivotally connected to said frame, and means for connecting said draw-bar to said transverse member including two relatively sliding members, one connected with said transverse member and the other having a universal connection with the draw-bar and arranged to transmit the swinging movement of the draw-bar to the steering knuckles.

4. In a vehicle of the character described, an axle having steering knuckles pivoted at its opposite ends and comprising steering arms, a steering rod connecting said arms together, a main frame mounted to have up-and-down movement relative to said axle, carrying wheels mounted on said knuckles, springs for supporting said frame upon said axle, a draw-bar pivotally connected to said frame and comprising an arm extending rearwardly from its pivot, and means for connecting the rear end of said draw-bar to the mid-portion of said steering rod comprising two relatively sliding members, one pivotally connected to the steering rod and the other having a universal connection with the draw-bar.

In testimony whereof, I have hereunto set my hand.

ADDI BENJAMIN CADMAN.